United States Patent [19]
Palyi

[11] 3,766,847
[45] Oct. 23, 1973

[54] METHOD AND DEVICE FOR THE PROCESSING OF CORN FOR FEEDING PURPOSES

[76] Inventor: Leslie Palyi, Larabee Crescent, Don Mills, Ontario, Canada

[22] Filed: July 16, 1971

[21] Appl. No.: 163,351

[52] U.S. Cl.......................... 99/518, 99/484, 99/536
[51] Int. Cl..... A01f 12/44, A23n 17/00, A23b 9/00
[58] Field of Search.................... 99/235, 234, 236, 99/516, 518–519, 484, 536; 146/4; 130/5 R

[56] References Cited
UNITED STATES PATENTS

| | | | |
|---|---|---|---|
| 1,981,409 | 11/1934 | Barra | 99/536 |
| 1,228,640 | 6/1917 | Belton | 99/235 A X |
| 3,243,264 | 3/1966 | Hickey | 99/236 C X |
| 3,263,592 | 8/1966 | Hickey et al | 99/235 R |

Primary Examiner—Wayne A. Morse, Jr.
Assistant Examiner—Arthur O. Henderson
Attorney—Samuel Ostrolenk et al.

[57] ABSTRACT

A method for processing corn, wherein the corn is first moistened to facilitate husk removal and then the husked corn is humidified to cause the kernels to absorb water. An apparatus for performing this method includes two separate humidifying stages and a conveyor therebetween for carrying the husked corn to the second stage.

3 Claims, 1 Drawing Figure

PATENTED OCT 23 1973
3,766,847
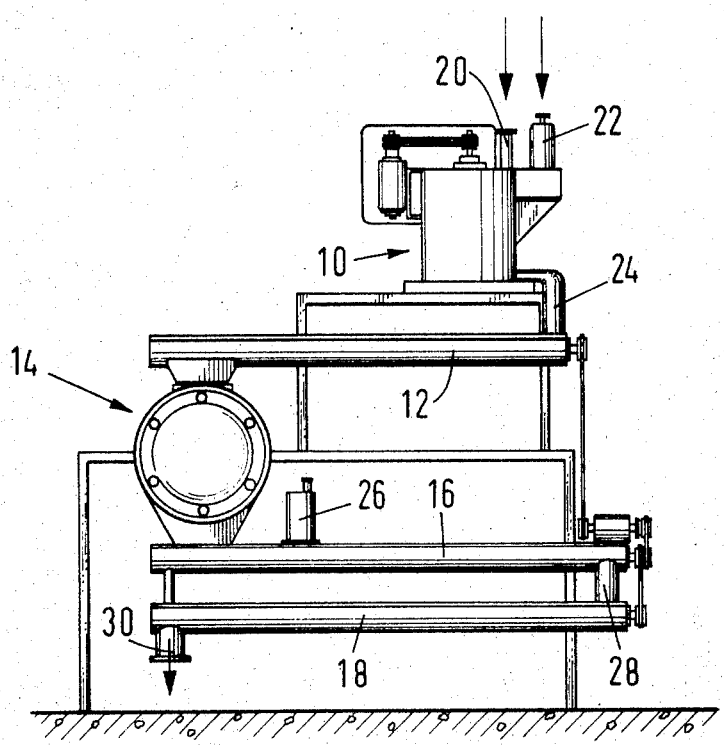
Inventor:
LESLIE PALYI
by
Ostrolenk, Faber, Gerb & Soffen
ATTORNEYS

METHOD AND DEVICE FOR THE PROCESSING OF CORN FOR FEEDING PURPOSES

The aim of the present invention is to prepare corn that is used for feeding purposes in such a manner that it can be utilized by the animal body better than have previously been the case and the animal is given an increased appetite in order to increase the body weight of the animals more rapidly than was previously possible.

In accordance with the invention the method is carried out in such a manner that firstly moistening of the corn is carried out by high pressure water jets while the corn is kept in movement, this leading to an increase in temperature, the moistening being carried out until the husk has a constant moisture content of for example 3 percent, and the husks, without breaking up the grain and without production of flour are removed and the corn is subjected to further humidification, the grains of the corn adsorbing as much water as is desired.

In the first stage of the method in this manner the husk or casing is provided with a certain degree of moisture, while in the end stage the whole grain is wetted as much as is desired by the absorption of liquid.

For the first moistening stage generally a period of 3 minutes is sufficient, while the following humidification can amount for example to 3 to 8 minutes. In the intermediate method step the husks are removed without breaking and without production of flour, however the husks together with the dehusked corn are subjected to the further processing and it has been shown that owing to this the aim as regards more favorable utilization of the feed material is attained. The greater degree of effectiveness is due, inter alia, to the fact that the corn can ferment to a stage ending shortly before the reversal point of sugar into alcohol. This can, for example, be caused by storing the corn treated in accordance with the method of the invention in a hermetically sealed manner.

The corn processed in accordance with the invention can either be fed immediately or it can be stored while hermetically sealed. Alternatively it can be stored in a conventional manner so as to ferment.

A completely new type of feed material is produced which moreover is more digestible than previously employed feed material.

The humidification procedure of the first method stage is carried out conveniently in a centrifugal humidifying device as described in the patent application of the applicant filed at the same time at the present application, Ser. No. 163,371, filed July 16, 1971, entitled "A Device for Humidifying Corn".

Between this humidifying device and the device carrying out the second method step a conveying screw is provided. For the first method step, in which without breaking and flour production the husks are removed, use is preferably made of a cleaning device, as is described in the German Pat. application P 19 38 328.9-23 for which a corresponding application has been filed by the inventor herein in the U.S.A., which has now issued into U.S. Pat. No. 3,703,200, issued Nov. 21, 1972. Such a device generally receives the husks or hulls and the cleaned grains separately. For carrying out the method in accordance with the invention these two materials from the machine are preferably combined together and fed to the humidifying device. This can, for example, and preferably consist of a screw conveyor with preferably several stages, the material absorbing as much water as is desired.

In what follows the invention will be described with reference to the device shown in the drawing. The single figure of the drawing is a diagrammatic representation of a plant in accordance with the invention.

The plant provided for carrying out the method in accordance with the invention comprises a centrifugal humidifier 10, whose output is connected with a conveying screw 12, which is connected to supply material to the corn cleaning device 14 for carrying out the second stage of the method. The output of this stage 14 is connected with a two stage conveying device 16, 18 in which the material is subjected to a further humidifying treatment.

The centrifugal humidifying device 10 corresponds, as mentioned above, preferably, to that device which is described in application Ser. No. 163,371. The cleaning machine 14 again corresponds preferably to the device described in the German Pat. application P 19 38 328.9-23 or U.S Pat. No. 3,703,200.

The device 10 is supplied with corn via the inlet 20 in a metered out amount, while water is supplied to the inlet 22 in the form of high pressure water jets, in an atomized form or as steam passing into the device, the device being so arranged that a thorough mixing and wetting can take place. In several centrifugal stages there follows a wetting of the corn grains, the husk being wetted until it contains a maximum moisture content of 3 percent. Superfluous water is removed by the centrifugal action. Simultaneously the device 10 serves to comminute co-hering masses of material and the material wetted in the dish passes in freely flowing form of the output end, from whence it is supplied via an intermediate part 24 to the inlet of the screw conveyor 12; whose outlet is connected with the inlet of the device 14. This device 14 described in U.S. Pat. No. 3,703,200 is characterised in that a drum is journalled so as to leave an adjustable axial annular gap between the end face of the drum and an annular face of a housing on the inlet side for the material and a cylindrical annular step on the periphery of the drum in the housing and in that the material supply opening leads into an annular space, surrounding the shaft, on the radial inner inlet end of the annular gap. In this device the dehusking procedure is carried out and simultaneously with the removal of the husks further cleaning functions can be carried out without further units being necessary for this purpose.

From the device 14 the cleaned grains, without being broken and without production of flour, pass into the conveying screw 16. In this condition uptake of water is possible and within the conveyer screw water is supplied via a water supply means 26. Via a intermediate part 28 the material passes from the outlet end of the conveying screw 16 to the input end of the conveying screw 18, where a further humidification can occur. At the outlet 30 the finished feeding material is removed.

The whole method can be carried out within a period of a few minutes completely, the first humidification of the outer husks requiring about 3 minutes while the following moistening requiring about 5 minutes. The material removed from the outlet can be immediately fed or can be stored in a suitable manner.

In the conveying device 12 between the centrifugal moistening device 10 and the cleaning machine 14 there again occurs a thorough mixing of the wetted material, this barring a clumping together of particles. Also in the conveying device following the cleaning machine 14 there occurs during the moistening and absorption of water by the grains a further favorable mixing so that a completely uniform output product of consistent quality is ensured.

I claim:

1. An apparatus for processing corn for feed purposes, comprising:

an inlet for corn;

a centrifugal humidifying device into which said inlet leads; said humidifying device having an outlet;

a first conveying screw connected with said humidifying device outlet; said first conveying screw having an output end;

a cleaning machine having an inlet and an outlet; said first conveying screw output end leading into said cleaning machine outlet; said cleaning machine including means for dehusking the corn and cleaning it; and having outlet openings for corn and husks;

a second conveying screw device being connected with said cleaning machine outlet openings and a further humidifying device in said conveying screw device.

2. The apparatus of claim 1, wherein both said conveying screw devices include means for mixing the wetted material to preclude clumping.

3. The apparatus of claim 2, further comprising:

a water inlet to said centrifugal humidifying device and a separate water inlet into said second conveying screw device.

* * * * *